Figure 1:
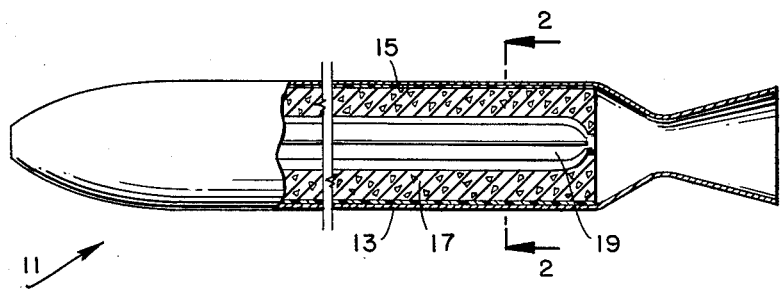

July 27, 1965 J. E. BALDWIN 3,196,735
METHOD OF CASTING A FOAM-CORED ROCKET PROPELLANT GRAIN
Filed June 12, 1962

*INVENTOR.*
JOHN E. BALDWIN
BY

*P. H. Firsht*
ATTORNEY.

United States Patent Office 3,196,735
Patented July 27, 1965

3,196,735
METHOD OF CASTING A FOAM-CORED
ROCKET PROPELLANT GRAIN
John E. Baldwin, San Jose, Calif., assignor to the United States of America as represented by the Secretary of the Navy
Filed June 12, 1962, Ser. No. 202,027
5 Claims. (Cl. 86—1)
(Granted under Title 35, U.S. Code (1952), sec. 266)

The invention herein described may be manufactured and used by or for the Government of the United States of America for governmental purposes without the payment of any royalties thereon or therefor.

The present invention relates to rocket propellant grains and methods of making same utilizing a mandrel of any configuration fabricated from an organic foam composition.

In the field of rocket propellant design, it has been the general practice to form the perforation of a cast rocket propellant by inserting a metal core or mandrel into special molds. These mandrels or cores require tapering to permit easy withdrawal after hardening of the propellant, and are usually coated with some special chemical release agent to prevent the cast propellant from sticking. Low melting alloys which can be poured out when heated and a mandrel made in several sections which can be disassembled and removed have also been utilized. Mandrels requiring draft for removal are difficult to fabricate and quite expensive and those which are made up of several pieces require precision machining and are also expensive. The meltout mandrel leaves a thin film of metal on the grain surfaces and as a result the grain is difficult to ignite.

The general purpose of this invention is to provide a simple method for making rocket propellant grains wherein an organic foam mandrel forms an integral part of the propellant grain thereby avoiding the aforementioned disadvantages of removable mandrels.

An object of the present invention is to provide a method to enable easy and efficient casting of complex shapes in rocket motor grains.

A further object is to provide a mandrel for achieving different types of surfaces on the propellant grain for ignition purposes.

A still further object is to provide an apparatus useful in controlled pressurization of a rocket motor during ignition.

Another object is the provision of added support to the propellant during storage of loaded rocket motors.

Yet another object of the present invention is the provision of a mandrel which may be utilized as an igniter booster for difficult ignition situations.

A still further object is to provide a mandrel which does not require removal after casting the propellant grain or other material.

A further object of the present invention is the provision of a mandrel which will prevent moisture from reacting with the propellant surface during long term storage of rocket motors.

Yet another object of the invention is the provision of a mandrel which eliminates a need for nozzle seals in high altitude rocket motors.

Another object of the present invention is the provision of a mandrel which has the economic advantages of being low on production cost.

Figure 2:
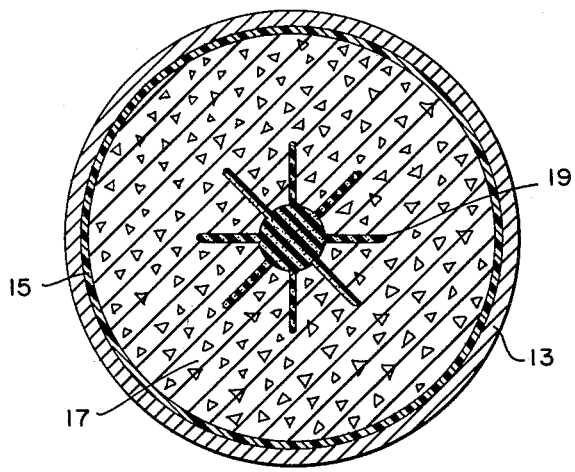

Other objects, features and many of the attendant advantages of this invention will become readily appreciated as the same become better understood by reference to the following description when considered in connection with the accompanying drawing wherein:

FIG. 1 is a fragmentary section of a rocket motor tube embodying the mandrel of the invention; and
FIG. 2 is a cross sectional view taken along the line 2—2 of FIG. 1.

FIG. 1 shows a rocket motor 11 comprising a metal casing 13 in which is cast propellant grain 17 which is coated with an inhibitor 15 of plastic or other suitable material; said grain 17 having been cast around an organic foam mandrel 19 which had been preformed and positioned in the empty motor casing before casting the grain. Mandrel 19 remains in the rocket motor becoming an integral part of grain 17.

FIG. 2 is a cross-section of FIG. 1 taken at line 2—2 showing mandrel 19 in combination with propellant grain 17 which is covered with an inhibitor 15 within rocket motor casing 13.

The organic foam composition used for the mandrel of the present invention was "Styrofoam" which is a trademark for a brand of expanded, cellular polystyrene. Other organic foams comprising an organic binder and oxidizer may be used such as the polyurethane foams. Also, the material selected for the mandrel may be an ignitable or nonignitable foam composition depending on the rocket motor design.

The mandrel may be formed in many ways, the most promising being casting, since it is also most economical. Machining of the foam into the desired shape may also be done. To cast a foam mandrel, the first step is to fabricate a master mold of metal, wood, plastic, or other suitable material. The foam composition is now poured or cast into the mold and allowed to cure, then the mandrel is placed in an empty rocket casing or tube ready for casting the propellant. An initiating igniter may be inserted in the foam before or after casting the grain.

In operation actual firing takes place with the foam bonded in place in the propellant grain, being an integral part thereof. The foam is blown out in the case of an inert foam, and is consumed in place when using an ignitable foam.

Obviously many modifications and variations of the present invention are possible in the light of the above teachings. It is therefore to be understood that within the scope of the appended claims the invention may be practiced otherwise than as specifically described.

What is claimed is:
1. A method for casting a foam-cored rocket propellant grain in situ in a rocket motor comprising (a) coating the inside of said motor with an inhibitor, (b) disposing a preformed organic foam core centrally within said motor, (c) casting a propellant grain mixture around said core, and (d) curing said grain in place, during which said core is bonded to the grain and becomes an integral part thereof.

2. The method of claim 1 wherein said organic foam core consists essentially of an ignitable foam composition.

3. The method of claim 1 wherein said organic foam consists essentially of polystyrene.

4. A method of forming a rocket propellant grain which consists of a foam core and propellant composition comprising providing a preformed organic foam core, positioning said core centrally within a motor casing the interior walls of which have been previously coated with an inhibitor material, casting a propellant grain composition around said core and curing said grain composition until set in place wherein said core and said grain composition become an integral part of said motor.

5. A method for fabricating a solid rocket propellant grain which consists of a foam mandrel and a propellant mixture comprising the steps of forming an organic foam mandrel by pouring a foam composition comprising expanded, cellular polystyrene into a master mold and allowing said composition to cure, disposing said mandrel within a casting, casting a solid propellant mixture around said mandrel, and curing said mixture during which said mandrel and said mixture form said grain.

References Cited by the Examiner

UNITED STATES PATENTS

| | | | |
|---|---|---|---|
| 2,681,619 | 6/54 | Chandler | 60—35.6 |
| 2,696,710 | 12/54 | Golden | 60—35.6 |
| 2,920,443 | 1/60 | Higginson | 60—35.6 |
| 2,959,001 | 11/60 | Porter | 60—35.6 |
| 2,970,343 | 2/61 | Johnson et al. | 18—45 |
| 2,987,882 | 6/61 | Nocke | 60—35.6 |
| 2,994,922 | 8/61 | Robson | 18—45 |
| 3,001,363 | 9/61 | Thibodaux et al. | 102—49 |
| 3,009,385 | 11/61 | Burnside | 86—1 |
| 3,010,355 | 11/61 | Cutforth | 86—1 |
| 3,062,147 | 11/62 | Davis et al. | 60—35.6 |
| 3,104,523 | 9/63 | O'Donnell | 60—35.6 |
| 3,107,620 | 10/63 | O'Donnell | 60—35.6 |
| 3,118,380 | 1/64 | Damon et al. | 102—98 |

BENJAMIN A. BORCHELT, *Primary Examiner.*

SAMUEL LEVINE, *Examiner.*